M. J. BROWN.
APPARATUS FOR MEASURING AND GASIFYING LIQUIDS.
APPLICATION FILED JUNE 29, 1921.
1,426,831.   Patented Aug. 22, 1922.
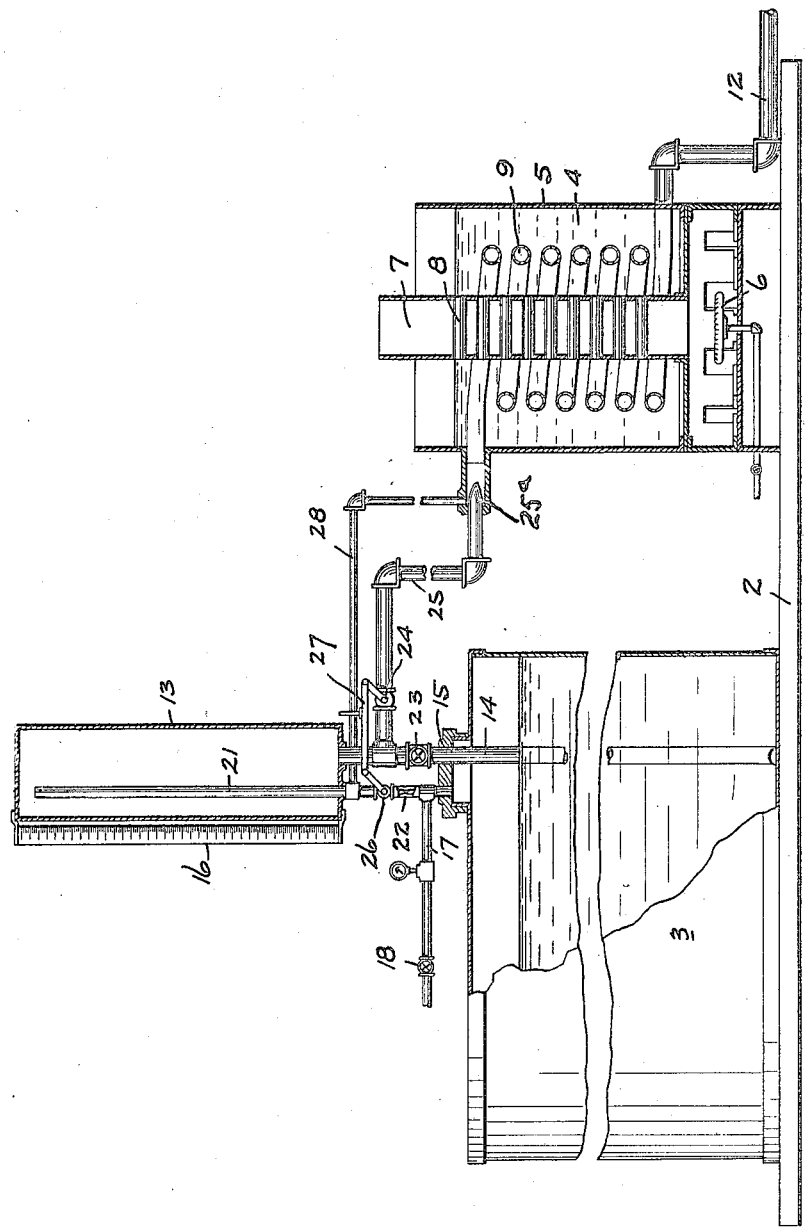

UNITED STATES PATENT OFFICE.

MORTIMER J. BROWN, OF LOS ANGELES, CALIFORNIA, ASSIGNOR TO THE PACIFIC R. & H. CHEMICAL CORPORATION, OF LOS ANGELES, CALIFORNIA, A CORPORATION OF CALIFORNIA.

APPARATUS FOR MEASURING AND GASIFYING LIQUIDS.

1,426,831.   Specification of Letters Patent.   Patented Aug. 22, 1922.

Application filed June 29, 1921. Serial No. 481,438.

*To all whom it may concern:*

Be it known that I, MORTIMER J. BROWN, a citizen of the United States, and a resident of Los Angeles, county of Los Angeles, and State of California, have invented a certain new and useful Apparatus for Measuring and Gasifying Liquids, of which the following is a specification.

The invention relates to an apparatus for measuring gasifying liquids, particularly very volatile and poisonous liquids, such as liquid hydrocyanic acid.

An object of the invention is to provide an apparatus for measuring and gasifying the measured charges of liquid, such as liquid hydrocyanic acid and discharging the resultant gas under controlled conditions of temperature and pressure.

Another object of the invention is to provide an apparatus whereby liquid hydrocyanic acid can be measured and gasified with minimum of labor and maximum security for operators.

The invention possesses other advantageous features, some of which, with the foregoing, will be set forth at length in the following description where I shall outline in full, that form of the invention which I have selected for illustration in the drawing accompanying and forming part of the present specification. In said drawing, I have shown one form of the apparatus of my invention, but it is to be understood that I do not limit myself to such form, since the invention, as set forth in the claims, may be embodied in a plurality of forms.

The drawing is a sectional elevation of the apparatus, partly diagrammatic in form.

The present apparatus is particularly adapted to be used for the production of hydrocyanic acid gas from liquid hydrocyanic acid for the fumigation of citrus trees but it is obvious that it may be employed for the production of other gases for the same or other purposes. I desire to have it understood that in all cases wherein reference is made to liquid hydrocyanic acid I mean either the hydrous or the anhydrous liquid, both of which it is possible to manufacture, although the hydrous liquid is the only one now available in large quantities. In such tree fumigating operations the tree is covered with a tent or other suitable envelop and an amount of hydrocyanic acid gas is introduced under the tent. The amount of gas required for the proper treatment of different trees varies and means are provided for producing different doses of gas for different trees. An excess of gas produces a deleterious effect on the tree and an insufficient amount of gas does not produce the desired results. The amount of gas required for the proper treatment of trees of different size has been determined and with the apparatus of my invention the exact amount required may be produced. The gas is extremely poisonous and must be handled with the greatest care to prevent disastrous results to the operator.

The apparatus comprises a suitable frame or platform 2, which is usually mounted on wheels so that the apparatus may be readily moved from tree to tree. Mounted on the platform is a container 3 of liquid hydrocyanic acid, which may be the container or drum in which the liquid is received. Arranged on the platform adjacent the container 3 is an artificially heated gasifier 4 of suitable construction, for converting the liquid hydrocyanic acid into hydrocyanic acid gas. The gasifier shown comprises a tank 5 containing water which is heated by the burner 6 disposed below the tank, the gases of combustion passing upwardly through a flue 7 extending through the tank which flue is provided with transverse water pipes 8 to cause increased heating efficiency of the burner. Submerged in the water in the tank is a helical coil 9 into which the liquid is introduced, wherein it is gasified and whence the gas discharges through the conduit 12. In regular operation, the temperature of the water is maintained at ninety degrees centigrade.

Disposed above the container 3 is a closed measuring chamber 13, into which the liquid passes from the container 3 through the conduit or pipe 14, which extends through the cap 15 to the bottom of the container. The measuring chamber may be made of glass and be provided with a measuring rack 16 or it may be made of metal and provided with a gauge glass or may be made in any other suitable manner which will permit it to measure predetermined variable charges of liquid. The liquid hydrocyanic acid in the container is forced upward into the measuring chamber through the pipe 14 by air under pressure, which is introduced into the container through a conduit 17 provided with a valve 18 and communicating with a source of air under pressure, such as a hand pump. Connected to the container 3 above the level of the liquid acid therein is a pipe 21 which extends up into the measuring chamber 13, opening into the chamber adjacent the top thereof. This pipe 21 is formed to permit the passage of a small quantity of air therethrough from the container to the measuring chamber and may be a pipe of very small internal diameter or may be a larger pipe having a constricted orifice 22 therein, which retards the passage of air through the pipe.

When the desired amount of liquid has been charged into the measuring chamber, the valve 23 in the conduit 14 is closed, and a valve 24 in the discharge conduit 25 connecting the conduit 14 with the coil 9 in the heater, is opened, permitting the liquid to flow from the measuring chamber into the heater. The discharge end of the pipe 25 is provided with a nozzle 25ᵃ from which the liquid is injected into the heating coil 9. The conduit 21 is provided with a valve 26 which is connected to the valve 24, as by the link 27, so that both valves are actuated in unison, the connection being such that both valves are open or both closed at the same time. The pipe 21 is connected to the heater coil 9 by a pipe 28, which serves to equalize the pressure in the heater coil and in the measuring chamber, when the liquid is being gasified in the heating coil, and also acts as a vent when the measuring chamber is being filled.

Before explaining the precise method of operation of this apparatus, I will explain some of the principles upon which it is constructed. In regular operation the heater 4 is held at a temperature of 90° C. If liquid hydrocyanic acid is introduced into the heater and gas is not allowed to escape the internal pressure will be substantially equal to the vapor pressure of the gas at the given temperature. There is, however, an outlet from the heater so that the gas may escape. Such being the case, the pressure within the gasifier varies directly as the rate of the input of the liquid into the gasifier, directly as the temperature of the gasifier and indirectly as the rate of exit of the gas. These three variables are easily kept under control. The temperature may fluctuate somewhat in practical operations but the rate of the exit of the gas presents no unusual mechanical problems. I will show below how the rate of input of liquid may be easily controlled.

The rate of input of the liquid into the gasifier depends upon the effective pressure of the liquid (which is the net difference between the hydrostatic pressure of the liquid and the back pressure from the gasifier) and the orifice through which the liquid passes. In other words, the speed of input of the liquid varies directly as the effective pressure and as the cross section of the orifice. It would therefore appear quite possible to vent back into a measuring chamber the internal pressure of the gasifier so that said pressure could be exerted on the top of the liquid, thus balancing the back pressure from below. Were such the case, it would be possible to discharge liquid into a gasifier with only two significant variables, one being the hydrostatic pressure of the liquid and the size of the orifice. Unfortunately, such an arrangement does not work satisfactorily in practical operation for the reason that when fumigators are treating citrus trees they do so at a rate as high as 50 to 75 trees in half an hour. This means that air is for all practical purposes entirely eliminated from the gasifier. Any gas escaping from the gasifier back into the measuring chamber must, therefore, be warm hydrocyanic acid gas. This, however, condenses as soon as it strikes the cooler surfaces of the measuring chamber and conduit and fails to produce the balanced pressure that is desirable. This feature has been overcome by introducing a small amount of non-condensable gas, such as air, between the gaseous hydrocyanic acid and the liquid hydrocyanic acid in the measuring chamber so that condensation is entirely eliminated and the pressure in the gasifier is effectively transmitted to the surface of the liquid in the measuring chamber 13. I found that this desired effect could be easily and satisfactorily accomplished by introducing air into the upper portion of the measuring chamber during the time that the liquid is discharging therefrom and I accomplish this by extending the pipe 21 down into the drum 3 and introducing a small orifice 22 and a valve 26 in the pipe 21 and connecting the valves 24 and 26 so that they work in unison. Therefore, when liquid is running from measuring chamber 13 through valve 24 into the gasifier there is simultaneously a leakage of air under pressure from drum 3 up into measuring chamber 13. Not only can this be done but a slight excess of air can be permitted to leak and escape through pipe 28 into the gasifier. This excess of air in gasifier 4 has no deleterious effect upon gasification. I have found, for example, that this kind of apparatus can be satisfactorily and rapidly worked with a pressure not to exceed five pounds per square inch in the drum. The orifice 22 can be made so small that the discharge of air from the drum is insignificant in so far as its influence upon the pressure in drum is concerned. In practical operations the workman maintains a pressure of 5 to 6 pounds in the drum. This can easily be done by use of a simple hand air pump and since there is no significant loss of air an occasional stroke of the pump is enough to maintain a pressure. In operation, valve 23 is opened, permitting liquid to rise in measuring chamber 13 and when it reaches the proper level, as shown in the scale, valve 23 is closed. This completes the measuring operation. For ejection nothing is required, but to open valves 24 and 26. Liquid passes from measuring chamber 13 into heater 4 and simultaneously air passes from drum 3 up into measuring chamber 13 and some air escapes through the pipe 28 into heater 4. These two operations constitute a complete cycle. The drawing shows the apparatus somewhat diagrammatically and in practice it may be designed to meet manufacturing requirements. The valves, for instance, may be combined in one valve casing having a plurality of ports and the valve plug formed to provide the necessary avenues of communication.

I claim:

1. An apparatus for measuring and gasifying measured charges of volatile liquid, comprising a measuring chamber, a gasifier connected to the measuring chamber, and means for transmitting the pressure produced in the gasifier by the gasification of the liquid to the liquid in the measuring chamber.

2. An apparatus for measuring and gasifying measured charges of volatile liquid, comprising a measuring chamber, a gasifier connected to the measuring chamber, to which the liquid flows from the measuring chamber and in which a pressure is produced opposing said flow and means for transmitting the pressure produced in the gasifier to the measuring chamber above the liquid therein whereby the opposing pressure is counterbalanced.

3. An apparatus for measuring and gasifying measured charges of volatile liquid, comprising a measuring chamber, a gasifier connected to the measuring chamber, to which the liquid flows from the measuring chamber and in which a pressure is produced opposing said flow, means for introducing a non-condensable gas into the measuring chamber above the liquid therein and means for transmitting the pressure produced in the gasifier to the measuring chamber above the liquid therein.

4. An apparatus for measuring and gasifying measured charges of volatile liquid, comprising a measuring chamber, a gasifier connected to the measuring chamber, to which the liquid flows from the measuring chamber and in which a pressure is produced opposing said flow, means for introducing air into the measuring chamber above the liquid therein and means for transmitting the pressure produced in the gasifier to the measuring chamber above the liquid therein.

5. An apparatus for measuring and gasifying measured charges of volatile liquid, comprising a measuring chamber, a gasifier connected to the measuring chamber, to which the liquid flows from the measuring chamber and in which a pressure is produced opposing said flow, means for introducing a non-condensable gas into the measuring chamber above the liquid therein and a connection between the said gas inlet means and the gasifier for balancing the pressure of the non-condensable gas in the measuring chamber against the pressure in the gasifier.

6. An apparatus for measuring and gasifying measured charges of volatile liquid, comprising a closed measuring chamber, a gasifier connected to the measuring chamber, to which the liquid flows from the measuring chamber and in which a pressure is produced opposing said flow, means for introducing air into the measuring chamber above the liquid therein and a connection between the air inlet means and the gasifier for equalizing the air pressure and the pressure in the gasifier and also to serve as a vent when said measuring chamber is being filled.

7. An apparatus for measuring and gasifying measured charges of volatile liquid, comprising a measuring chamber, a gasifier connected to the measuring chamber to which the liquid flows from the measuring chamber, wherein it is gasified producing a pressure opposing the flow of the liquid and from which the gas discharges as formed, and a conduit connecting the gasifier with the measuring chamber to balance the gas pressure on opposite sides of the liquid.

8. An apparatus for measuring and gasifying measured charges of volatile liquid, comprising a container for the liquid, a closed measuring chamber, a conduit connecting the container below the level of the liquid therein with the measuring chamber, a gasifier, a second conduit connecting the measuring chamber with the gasifier through which liquid flows from the measuring chamber to gasifier and a third conduit connecting the measuring chamber with the gasifier to transmit the pressure produced in the gasifier to the top of the measuring chamber.

9. An apparatus for measuring and gasifying measured charges of volatile liquid, comprising a container for the liquid, a closed measuring chamber, a conduit connecting the container below the level of the liquid therein with the measuring chamber, a gasifier, a second conduit connecting the measuring chamber with the gasifier through which liquid flows from the measuring chamber to gasifier, means for introducing air under pressure into the container, a third conduit connecting the container above the level of the liquid therein with the upper portion of the measuring chamber, a fourth conduit connecting the upper portion of the measuring chamber with the gasifier and valves in said first, second and third conduits.

10. An apparatus for measuring and gasifying measured charges of volatile liquid, comprising a container for the liquid, a closed measuring chamber, a conduit connecting the container below the level of the liquid therein with the measuring chamber, a gasifier, a second conduit connecting the measuring chamber with the gasifier through which liquid flows from the measuring chamber to gasifier, means for introducing air under pressure into the container, a third conduit connecting the container above the level of the liquid therein with the upper portion of the measuring chamber, a fourth conduit connecting the upper portion of the measuring chamber with the gasifier and similarly and simultaneously operated valves in said second and third conduits.

11. An apparatus for measuring and gasifying measured charges of volatile liquid, comprising a closed measuring chamber, a gasifier connected to the measuring chamber to which the liquid flows from the measuring chamber and in which a pressure is produced by the gasification of the liquid, means for introducing air under pressure into the measuring chamber above the liquid therein and a conduit connecting the measuring chamber above the liquid with the gasifier to balance the air pressure and the gasifier pressure.

12. The method of discharging volatile liquid from a closed chamber to a gasifier in which pressure is produced by the gasification of the liquid, which comprises introducing air under pressure into the chamber above the liquid and causing the gasifier pressure to control the air pressure in the chamber.

13. The method of discharging volatile liquid from a closed chamber to a gasifier in which pressure is produced by the gasification of the liquid, which comprises introducing air under pressure into the chamber above the liquid and connecting the air conduit with the gasifier whereby the gasifier pressure and the air pressure in the chamber are equalized.

In testimony whereof, I have hereunto set my hand.

MORTIMER J. BROWN.